United States Patent [19]
Saferstein

[11] 3,864,310
[45] Feb. 4, 1975

[54] HIGH PERFORMANCE HETEROCYCLIC POLYMER POLYMERIZATION VIA MOLTEN LEWIS ACID EUTECTICS

[75] Inventor: Lowell Saferstein, Piscataway, N.J.

[73] Assignee: Celanese Corporation, New York, N.Y.

[22] Filed: Nov. 14, 1973

[21] Appl. No.: 415,706

Related U.S. Application Data

[63] Continuation-in-part of Ser. No. 221,780, Jan. 28, 1972, abandoned.

[52] U.S. Cl........... 260/47 CP, 260/2 R, 260/78 TF, 260/78.4 R, 260/79
[51] Int. Cl............................................ C08g 20/20
[58] Field of Search........ 260/47 CP, 78.4 R, 78 TF

[56] References Cited
OTHER PUBLICATIONS
Van Deusen et al., J. Polem. Sci., Part A-1, Vol. 6, 1777–1793, (1968).

*Primary Examiner*—Melvin Goldstein

[57] ABSTRACT

An improved process is provided for the synthesis of high performance heterocyclic polymers wherein the polymerization is conducted in the presence of a molten Lewis Acid eutectic selected for its ability to dissolve the high molecular weight polymer; to remove water produced via the condensation reaction; and to melt substantially below the polymerization reaction temperature.

10 Claims, No Drawings

HIGH PERFORMANCE HETEROCYCLIC POLYMER POLYMERIZATION VIA MOLTEN LEWIS ACID EUTECTICS

CROSS-REFERENCE TO RELATED APPLICATION

This application is a continuation-in-part of U.S. Pat. application, Ser. No. 221,780, filed on Jan. 28, 1972, by the same inventive entity, now abandoned.

BACKGROUND OF THE INVENTION

High performance heterocyclic polymers, i.e., highly aromatic, non-melting heterocyclic polymers, although useful for the production of flame resistant fibers and films, show limited solubility in all solvents except for certain very concentrated acids such as sulfuric, polyphosphoric, and methane sulfonic acid. The solubility of the polymers in these acids is due, in part, to the protonation of either the heteroatoms present in the polymer e.g. nitrogen, sulfur, or oxygen atoms or perhaps the aromatic rings themselves. Typical of the manifold problems presented by polymerization processing in these concentrated acid solutions are the following:

1. large volumes of acid are required per unit of polymer, i.e., the polymerization must be conducted at low solid levels because of the very high viscosity of the dope solutions;
2. the above-mentioned high viscosity of the processing dopes make agitation difficult.
3. reaction times are very long, i.e., usually in excess of about 18 hours;
4. the concentrated acids are extremely corrosive; and
5. in addition to initial expense, there exists severe handling, disposal, and/or acid recovery problems.

It is an object of this invention to provide an improved high performance heterocyclic polymer polymerization process whereby a greater conversion of polymer per unit weight of Lewis acid solvent is realized as compared to the concentrated acid syntheses of the prior art, and, in addition, to significantly shorten polymerization reaction times.

It is also an object of this invention to simplify the mode of the polymerization by eliminating the heretofore necessarily elaborate precautions to exclude moisture during the polycondensation reactions and to substantially lower the polymerization process operating temperatures.

These and other objects, as well as the scope, nature, and utilization of the invention will be apparent from the following detailed description and appended claims.

SUMMARY OF THE INVENTION

It has been found that certain molten Lewis Acids preferably heavy metal halides, provide ideal media for the synthesis of high performance heterocyclic polymers. The molten Acid is selected for its ability to dissolve the high molecular weight polymer by coordinating with the heteroatoms present in the polymer or with the aromatic rings themselves; and remove water produced by the condensation reactions.

The instant invention improves the above-described process by utilizing selected eutectic mixtures of said Lewis Acids to (1) substantially lower the melting point of the molten solvent and thereby eliminate the need for exotic construction materials, and (2) enable more effective, yet expensive, Lewis Acids to be utilized economically.

DETAILED DESCRIPTION OF THE INVENTION

It has been observed that when high performance heterocyclic polymers are to be synthesized, large volumes of highly concentrated acids have been required for the polymerization media.

This is so because concentrated acids are necessary to dissolve the highly aromatic, non-melting, heterocyclic polymers and dopes made from these acids have extremely high viscosities; therefore in order to maintain viscosity levels at which agitation is realizable, very low solids levels are utilized. Concentrated acids are, of course, extremely corrosive to most construction materials, including glassware, and their use results in attendant polymer adulteration by dissolved container material as well as solvent handling and disposal problems. Also, a significant economic problem exists when highly concentrated acid solvents such as polyphosporic acid, are sought to be recovered for re-use.

Heterocyclic polymers may be synthesized and the above-described problems significantly reduced and/or eliminated by utilizing a molten Lewis Acid in lieu of the highly concentrated acids, as the polymerization media.

The use of the molten Lewis Acid medium serendipitously produces many additional advantages, such as significant reduction of reaction times, relative to those realized in the syntheses in concentrated acids.

Lewis Acids, i.e., substances containing an element which is two electrons short of having a complete valence shell, provide ideal media for synthesizing the high performance heterocyclic polymers of the instant invention for they, like the concentrated acid protons, are electrons pair acceptors and thus coordinate strongly with atoms such as nitrogen, oxygen, or the $\pi$ electrons of the aromatic ring. This coordination is extremely strong between atoms such as nitrogen, oxygen and sulfur with the metallic ions, such as tin, zinc, or antimony, of the heavy metal, transition element molten halides.

The fused Lewis Acid, selected for the medium of a given polymer synthesis should possess the preferred characteristics of being able to dissolve the high molecular weight polymer which is being formed so that during the polymerization, premature precipitation of the polymer of low molecular weight does not occur; and also be a chemical dehydrating agent, i.e., capable of absorbing condensation water by either hydrolyzing or forming water of hydration.

However, almost all of these Lewis Acids have melting points in excess of 190°C. Since many of the heterogeneous high performance polymers have a tendency to irreversibly crosslink into an insoluble polymer if the polymerization temperatures exceeds 200°C. an impasse exists i.e., it would appear that the actual use of molten Lewis Acids per se as a polymerization media would be extremely limited.

To obviate this temperature limitation on the selection of Lewis Acid media, the instant invention teaches the use of the Lewis Acid as part of a eutectic solution wherein the melting point of said solution is substantially lower than the decomposition or crosslinking temperature of the reaction polymer.

The preferred Lewis Acids of the instant invention are the heavy metal halides. The more preferred of the molten Lewis Acids are the heavy metal chlorides and non-hydrolyzable bromides. The most preferred are the heavy metal chlorides and non-hydrolyzable bromides selected from the group consisting essentially of antimony trichloride; bismuth trichloride; aluminum trichloride; stannous dichloride; stannic tetrachloride; gallium chloride; germanium bromide; germanium chloride; titanium tetrachloride; arsenic trichloride; indium trichloride; zinc bromide, and zinc chloride.

The second compound of the Lewis Acid eutectic should possess the desired characteristics of (1) forming a eutectic with said Lewis Acid whereby the resulting eutectic has a melting point substantially lower than the decomposition or crosslinking temperature of the reaction polymer product, and (2) being a neutral component reactively i.e., not a Lewis base. The resulting eutectic should possess the properties of being capable of dissolving the high molecular weight polymer; and removing water produced via the condensation reaction.

Illustrative of a preferred eutectic solvent is $ZnCl_2$-$SnCl_2$ (44 mole percent – 56 mole percent wherein the melting points of $ZnCl_2$ (280°C) and $SnCl_2$ (247°C) are lowered to 171°C. The following table illustrates but is by no means exhaustive of the typical eutectic solvents contemplated for use in the instant invention.

TABLE I

| Components A - B | Composition (mole % B) | Eutectic Temp. (°C) |
|---|---|---|
| $NaCl-AlCl_3$ | 81 | 105 |
| $KCl-AlCl_3$ | 67 | 128 |
| $ZnCl_2-SnCl_2$ | 56 | 171 |
| $CuCl-SnCl_2$ | 66 | 172 |
| $TiCl-SnCl_2$ | 72 | 178 |
| $KCl-SnCl_2$ | 62 | 180 |
| $NaCl-SnCl_2$ | 68 | 183 |
| $TiCl-ZnCl_2$ | 52 | 193 |
| $ZnCl_2-KCl$ | 46 | 228 |
| $SnCl_2-MnCl_2$ | 40 | 233 |
| $SnCl_2-CoCl_2$ | 4 | 240 |
| $CuCl-ZnCl_2$ | 88 | 242 |
| $KCl-ZnCl_2$ | 71 | 262 |
| $NaCl-ZnCl_2$ | 59.5 | 262 |
| $InCl_3-ZnCl_2$ | 96 | 276 |
| $CoCl_2-ZnCl_2$ | 93 | 311 |

Also contemplated with the scope of the instant invention is the use of ternary eutectic mixtures such as the following:

| | | |
|---|---|---|
| $NaCl-KCl-AlCl_3$ | 20-16.5-63.5 | 89 |
| $ZnCl_2-NaCl-KCl$ | 60-20-20 | 203 |

The high performance heterocyclic polymers contemplated to be produced by the instant invention are those such as polybenzimidazoles, polybenzoxazoles, polybenzothiazoles, aromatic polyimides; aromatic polyoxadiazoles, aromatic polypyrazoles; polyquinoxalines; and polyquinoxaline ladder polymers; aromatic polythiadiazoles, aromatic polythiazoles; aromatic polytetrazopyrenes; aromatic poly-4-phenyl-1, 2, 4 - triazoles; poly (quinazolinediones) and poly (benzoxazinones); polyquinone ethers and thioethers; poly (imidazopyrrolones) and the poly (benzemidazobenzaphenanthrolines).

Polybenzimidazoles which may be synthesized by the instant invention and their preparation are more fully described in the U.S. Pat. No. 2,895,948, United States Reissue Patent No. 26,065, and in the Journal of Polymer Science, Vol. 50, pages 511–539 (1961) which are herein incorporated by reference. The polybenzimidazoles consist essentially of recurring units of the following Formulas I and II. Formula I is:

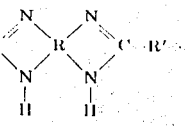

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyrudubem (b) pyrazine, (c) furan, (d) quinoline, (e) thiophene, and (f) pyran. Formula II is:

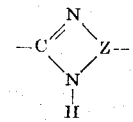

wherein Z is an aromatic nucleus having the nitrogen atoms forming the benzimidazole ring paired upon adjacent carbon atoms of the aromatic nucleus.

Preferably, aromatic polybenzimidazoles are selected, e.g., from polymers consisting essentially of the recurring units of Formulas I and II wherein R' is an aromatic ring or a heterocyclic ring.

As set forth in United States Reissue Patent No. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2, 5 (6) - benzimidazole prepared by the autocondensation of phenyl-3, 4-diaminobenzoate.

Also set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxyl compound selected from the class consisting of (a) the dihpenyl ester of an aromatic dicarbocylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

The aromatic tetraamines may be represented by the general formula:

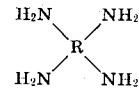

wherein R is aromatic and each amino group of said tetraamine is attached directly to a carbon atom of the aromatic nucleus and is ortho or peri relationship to another of the directly attached amino groups.

The R aromatic may be any mono or poly nuclear aromatic such as phenylene, naphthalene, biphenylene and the like. More particularly, it may be a mono or poly nuclear aromatic such as whereby R''' can be an aliphatic group containing from one to six, and preferably from one to three, carbon atoms; an aromatic group; e.g., phenylene;

$$-\overset{O}{\underset{}{C}}-;\ -\overset{O}{\underset{O}{S}}-;\ -O-;\ -\overset{\phi}{\underset{\phi}{C}}-;\ -\overset{H}{\underset{\phi}{N}}-;$$

a covalent bond; or the like.

Preferably, R''' is a covalent bond or —O—, and is para to an amino group on each aromatic nucleus. The R and R''' groups may also contain inert substituents, i.e., substituents which do not interfere with the polymerization reaction in the system.

Non-limiting examples of suitable specific aromatic tetraamines which may be used in the present invention are 3, 3' diamino benzidine; bis(3,4-diamino phenyl) methane; 1,2-bis (3,4-diamino phenyl) ethane; 2,2'-bis(3,4-diamino phenyl) propane; bis (3,4-diamino phenyl) sulfide; bis (3,4-diamino phenyl) sulfone; 1,4,5,8-tetraamino naphthalene; bis (3,4-diamino phenyl) ether; 1,2,4,5-tetraaminobenzene; 2,3,6,7-tetraaminonaphthalene; and the corresponding ring hydrogenated tetraamines.

The preferred aromatic tetraamines are 3,3'-diaminobenzidine and bis (3,4-diamino phenyl) ether.

The manner in which the aromatic tetraamine is prepared is well known and does not form a part of the present invention.

Non-limiting examples of anhydrides and aliphatic and aromatic diesters of aromatic dicarboxylic acids include the anhydrides, alkyl esters having from one to twelve carbon atoms in the alkyl group and diphenyl esters corresponding to isophthalic acid, terephthalic acid, naphthalene 1,4-dicarboxylic acid, naphthalene 1,6-dicarboxylic acid, naphthalene 2,6-dicarboxylic acid, bibenzoic acid, 4,4' -bibphenyl dicarboxylic acid, diphenyl ether 4,4' dicarboxylic acid, and diphenyl methane 4,4'-dicarboxylic acid.

Non-limiting examples of suitable diphenyl esters of heterocyclic dicarboxylic acids include the diphenyl esters corresponding to pyridine 2,5-dicarboxylic acid, pyridine, 2,6 dicarboxylic acid, pyridine 3,5-dicarboxylic acid, pyrazine 2,5-dicarboxylic acid, furan 2,5-dicarboxylic acid and quinoline 2,6-dicarboxylic acid.

Further, aliphatic dicarboxylic acids may be used. The use of these aliphatic dicarboxylic acids, however, may lessen the thermal stability of the copolymer.

The aliphatic dicarboxylic acids may be represented by the general formula:

$$HOOC - R' - COOH$$

wherein R' is a divalent aliphatic hydrocarbon radical, and preferably an aliphatic hydrocarbon radical consisting of methylene groups.

Particularly useful dicarboxylic acids are those wherein the number of methylene groups varies from 4 to 8.

Non-limiting examples of suitable specific aliphatic dicarboxylic acids which may be used in the present invention are sebacic and adipic acids.

Examples of polybenzimidazoles which have the recurring structure of formula I are as follows:
poly-2,2'-(m-phenylene)5,5'-bibenzimidazole;
poly-2,2'-(pyridylene-3'',5'')-5,5'-bibenzimidazole;
poly-2,2'-(furylene-2'',5'')-5,5'-bibenzimidazole;
poly-2,2'-(naphthalene-1'',6'')-5,5'-bibenzimidazole;
poly-2,2'-(biphenylene-4'',4'')-5,5'-bibenzimidazole;
poly-2,2'-(amylene)-5,5'-bibenzimidazole;
poly-2,2'-octamethylene-5,5'-bibenzimidazole;
poly-2,6 -(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2,2''-(m-phenylene)-5,5'-di(benzimidazole)-propane-2,2; and
poly-2,2''-(m-phenylene)-5,5'-di(benzimidazole)-ethylene-1,2
where the double bonds of the ethylene groups are intact in the final polymer.

Polybenzoxazoles which may be synthesized by the method of the instant invention include those prepared by reacting dicarboxylic compounds such as afore described with a diaminodihydroxy aromatic compound having each of the hydroxy groups in ortho or peri relationship to one of the amino groups.

The diaminodihydroxy aromatic compounds may be represented by the general formula:

$$H_2N \diagdown \diagup NH_2$$
$$R$$
$$HO \diagup \diagdown OH$$

wherein R has the meaning given above in the tetraamine description and each amino/or hydroxy group of said compound is attached directly to a carbon atoms of the aromatic nucleus and each hydroxy group is in ortho or peri relationship to one of the directly attached amino groups.

R''' is preferably a covalent bond, and is preferably para to the amino group or para to the hydroxy group on each aromatic nucleus.

Non-limiting examples of suitable specific diaminodihydroxy compounds which may be used in the present invention are 3,3′-diamino, 4,4′-dihydroxy-biphenyl; 3,3′-dihydroxy, 4,4′-diaminobiphenyl; 3,3′-dihydroxy 4,4′-diamino diphenyloxide; 3,3′-dihydroxy 4,4′-diamino diphenylsulfone; 2,2′-bis (3-amino -4-hydroxy-phenyl) propane; bis (3-hydroxy 4-aminophenyl) methane; 3,3′-dihydroxy-4,4′-diamino benzophenone; 1,1-bis(3-hydroxy-4-aminophenyl) ethane; 1,3-bis(hydroxy-4-amino-phenyl) propane; and 2,2′-bis (3-hydroxy-4-aminophenyl) propane.

The manner in which the diaminohydroxy aromatic compound is prepared is not a part of the present invention and is well known.

Polybenzothiazoles which may be synthesized by the method of the instant invention include those prepared by reacting dicarboxylic compounds such as aforedescribed with a diamino-dimercapto aromatic compound having each of the mercapto groups in ortho or peri relationships of one of the amino groups.

The diamino-dimercapto aromatic compounds may be represented by the general formula:

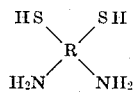

wherein R has the meaning given above in the tetramine description and each amino and/or mercapto group of said compound is attached directly to a carbon atom of the aromatic nucleus and each mercapto group in ortho or perio relationship to one of the directly attached amino groups.

R′′′ is preferably a convalent bond and is preferably para to the amino group or para to the mercapto group on each aromatic nucleus.

Non-limiting examples of suitable specific diamino dimercapto compounds which may be used in the present invention are those prepared by the reaction of 3,3′-diamino-4,4′ dimercapto biphenyl with isophthalic acid; with pyridine-3,5-dicarboxylic acid; 4,4′ oxydibenzoic acid; 4,4′-ketodibenzoic acid; and 3,-amino-4-mercapto benzoic acid.

Polyamic acid polymers which may be synthesized by the method of the instant invention include those prepared by the reaction of an organic diamine with an aromatic dianhydride.

Illustrative of the aromatic diamines which may be used in the present invention are those which may be depicted by the following general formula:

wherein Y is
—$C_6H_4$—, —$C_{10}H_6$—, —$C_{14}H_8$—, —$C_6H_4$—$C_6H_4$—, —$C_6H_4$—R—$C_6H_4$—, wherein R is as defined below, and the like. Y may be substituted with groups which do not detrimentally interfere with the reaction.

Illustrative subcategories of the diamines which may be used are:
I. Compounds of the general formula:

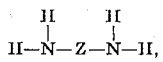

wherein Z is —$C_6H_4$—, —$C_{10}H_6$—, —$C_{14}H_8$—;
II. Compounds of the general formula:

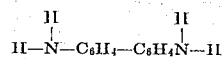

III. Compounds of the general formula:

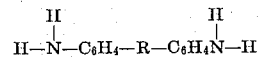

wherein R may be

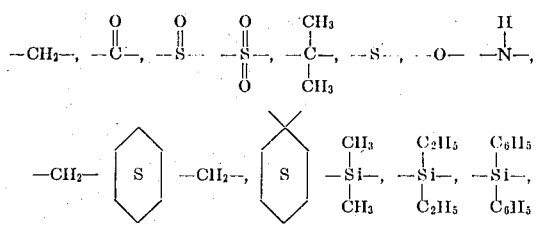

or the like.

Illustrative of particular aromatic diamines which may be used in the process of this invention are the following:
m-phenylene diamine
p-phenylene diamine
o-phenylene diamine
1,4-naphthalene diamine
1,5-naphthalene diamine
1,6-naphthalene diamine
1,7-naphthalene diamine
1,8-naphthalene diamine
2,3-naphthalene diamine
2,6-naphthalene diamine
2,7-naphthalene diamine
1,4-diamino-2-methyl-naphthalene
1,4-diamino-anthracene
2,6-diamino-anthracene
9,10-diamino anthracene
9,10-diamino-phenanthrene
2,2′-diamino-biphenyl
2,4′-diamino-biphenyl
3,3′-diamino-biphenyl
3,4′-diamino-biphenyl
4,4′-diamino-biphenyl
4,4′-diamino-2,2′-dimethyl-biphenyl
1,1-bis(4-aminophenyl) cyclohexane
bis(4-aminophenyl) dimethyl silane
bis(4-aminophenyl) diethyl silane
bis-(4-aminophenyl) diphenyl silane
bis(4-aminophenyl) amine
bis(4-aminophenyl) ether, i.e.,
  4,4′-diamino diphenyl ether
bis(4-aminophenyl) thioether
2,2′-bis(4-aminophenyl) propane
bis(4-aminophenyl) sulfone
bis(4-aminophenyl) sulfoxide
bis(4-aminophenyl)ketone
bis(4-aminophenyl) methane By the term "aromatic diamine" is meant a compound in which the two amino groups are each attached to an aromatic ring, not necessarily both attached to the same ring, however. Generally, any aromatic diamine containing up to about 30 carbon atoms can be used in the present invention. Preferably the diamine contains up to about 20 carbon atoms, most preferably up to about 15 carbon atoms. The most preferred diamines are benzidine and oxydianiline.

Suitable aromatic dianhydrides are those derived from the tetracarboxylic acids of the general formula:

$$\begin{array}{c} HOOC \\ HOOC \end{array} R^3 \begin{array}{c} COOH \\ COOH \end{array}$$

wherein $R^3$ is a tetravalent organic radical, e.g., aromatic, aliphatic, cycloaliphatic, heterocyclic, combination of aromatic and aliphatic, or substituted groups thereof. Illustrative are the following:

wherein $R^4$ is alkylene of 1–3 carbon atoms, oxygen, sulfur, or one of the following:

$$-SO_2-, \ -\overset{O}{\underset{\|}{C}}-, \ -\overset{O}{\underset{\|}{C}}-O-, \ -\overset{O}{\underset{\|}{C}}-\overset{H}{\underset{|}{N}}-, \ -\overset{O}{\underset{\|}{C}}-\overset{R^5}{\underset{|}{N}}-, \ -\overset{R^5}{\underset{|}{N}}-$$

$$-\overset{R^5}{\underset{R^5}{\underset{|}{Si}}}-, \ -O-\overset{R^5}{\underset{R^5}{\underset{|}{Si}}}-O-, \ -\overset{R^5}{\underset{\overset{\|}{O}}{\underset{|}{P}}}- \ \text{and} \ -O-\overset{R^5}{\underset{\overset{\|}{O}}{\underset{|}{P}}}-O-$$

wherein $R^5$ is alkyl or aryl, and/or substituted groups thereof.

In these acids every carbonyl group above is attached directly to a separate carbon atom of the aromatic radical, the carbonyl groups being in pairs, the groups of each pair being adjacent to each other. Adjacent means ortho or peri, so that the dicarboxylanhydro rings are 5- or 6- membered, respectively.

The preferred acids are the aromatic tetracarboxylic acids, those in which the $R^3$ groups have at least one ring of 6 carbon atoms characterized by benzenoid unsaturation (alternate double bonds in a ring structure), and particularly those aromatic acids wherein the 4 carbonyl groups of the acid are each attached to separate carbon atoms in a benzene ring and wherein the carbon atoms of each pair of carbonyl groups is directly attached to adjacent carbon atoms in a benzene ring of the $R^3$ group.

Illustrative of acids are the following:
pyromellitic acid
2,3,6,7-naphthalene tetracarboxylic acid
3,3',4,4'-diphenyl tetracarboxylic acid
1,2,5,6-naphthalene tetracarboxylic acid
2,2',3,3'-diphenyl tetracarboxylic acid
2,2-bis(3,4-dicarboxyphenyl)propane
bis(3,4-dicarboxyphenyl)sulfone
3,4,9,10-perylene tetracarboxylic acid
ethylene tetracarboxylic acid
naphthalene-1,2,4,5-tetracarboxylic acid
naphthalene-1,4,5,8-tetracarboxylic acid
decahydronaphthalene-1,4,5,8-tetracarboxylic acid
4,8-dimethyl-1,2,3,5,6,7-hexahydronaphthalene-1,2,5,6-tetracarboxylic acid
2,6-dichloronaphthalene-1,4,5,8-tetracarboxylic acid
2,3,6,7-tetrachloronaphthalene-1,4,5,8-tetracarboxylic acid
phenanthrene-1,8,9,10-tetracarboxylic acid
cylcopentane-1,2,3,4-tetracarboxylic acid
pyrrolidine-2,3,4,5-tetracarboxylic acid
pyrazine-2,3,5,6-tetracarboxylic acid
2,2-bis(2,3-dicarboxyphenyl) propane
1,1-bis(2,3-dicarboxyphenyl)ethane
1,1-bis(3,4-dicarboxyphenyl)ethane
bis(2,3-dicarboxyphenyl)methane
bis(3,4-dicarboxyphenyl)methane
bis(3,4-dicarboxyphenyl)sulfone
benzene-1,2,3,4-tetracarboxylic acid
1,2,3,4-butene tetracarboxylic acid
thiophene-2,3,4,5-tetracarboxylic acid
3,4,3',4'-benzophenone tetracarboxylic acid
2,3,2',3'-benzophenone tetracarboxylic acid
2,3,3',4'-benzophenone tetracarboxylic acid Of course, homopolymers of polyamic acids can be synthesized via 4-amino-phthalic anhydride; 3-amino naphthalic anhydride; and 4-amino naphthalic anhydride.

Suitable polyimides which may be produced via the medium of the instant invention include those derived from the dehydration of the above-described polyamic acid polymers.

Illustrative of the poly oxadiazoles which may be prepared by the instant invention are those which may be depicted by the general formula:

I $$\left[ -R_1-\overset{N}{\underset{N}{\overset{\|}{C}}}\overset{}{\underset{O}{\diagup}}C-R_2-\overset{N}{\underset{O}{\overset{\|}{C}}}\overset{}{\underset{N}{\diagup}}C- \right]_x$$

and

II $$\left[ -R_1-\overset{O}{\underset{N}{\overset{\|}{C}}}\overset{}{\underset{N}{\diagup}}C-R_2-\overset{O}{\underset{N}{\overset{\|}{C}}}\overset{}{\underset{N}{\diagup}}C- \right]_x$$

wherein $R_1$ and $R_2$ are
$-C_6H_4-$; $-C_{10}H_6-$; $-C_{14}H_8-$; $-C_6H_4-C_6H_4-$;
$-C_6H_4-R-C_6H_4-$;
wherein R may be

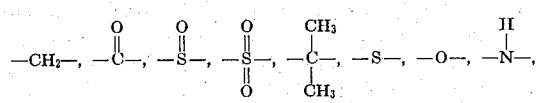

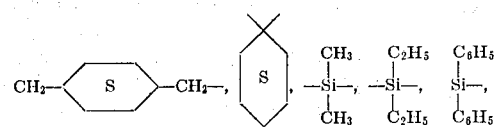

or the like.

Illustrative of the particular poly-1,2,4-oxydiazoles which may be prepared by the instant process are those wherein $R_1$ is 1,3 phenylene and $R_2$ is 1,4 phenylene; both $R_1$ and $R_2$ are 1,3-phenylene; and wherein both $R_1$ and $R_2$ are 1,4-phenylene.

Poly-thiadiazole polymers may also be prepared via the instant process. Suitable polymers are illustrated by the sulfur anologs of the above-described oxydiazoles.

Typical of the polypyrazoles which may be prepared via the instant process are those synthesized by the reaction of 1,6-bis(diazo) hexane with 1,4-diethynylbenzene; 1,6-bis (diazo) hexane with diacetylene; 1,4-bis(diazo) xylene with 1,4-diethynylbenzene; 1,3-dihydrazinobenzene with 1,1,2,2-tetra acetylethane, and p-bis(diazo) benzene with p-diethylnybenzene.

With the instant invention, poly quinoxalines may be prepared by the reaction of tetracarbonyl compounds such as 1,4-diglyoxalbenzene with aromatic tetraamine compounds heretofore described to yield polymers, specific examples of which are the following:

Poly-2,2'-(1,4-phenylene)-6,6'-diquinoxaline
Poly-2,2'-(1,4-phenylene)-6,6'-oxydiquinoxaline
Poly-2,2'-(1,3-phenylene)-6,6'-diquinoxaline
Poly-2,2'-(1,3-phenylene)-6,6'-oxydiquinoxaline
Poly-2,2'-(4,4'-oxydiphenylene)-6,6'-diquinoxaline
Poly-2,2'-(4,4'-oxydiphenylene)-6,6'-oxydiquinoxaline Other high performance heterocyclic polymer which may be prepared by the instant invention are the aromatic polythiazoles and polydithiazoles illustrated by the general formula:

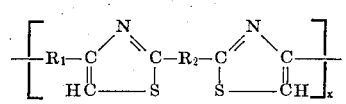

wherein $R_1$ may be
  1,4-Tetramethylene
  1,4-Phenylene
  1,3-Phenylene
  1,4-Cyclohexylene
  4,4'-Biphenylene
  Bis(4-phenylene)methane
  Bis(4-phenylene)ether
  2,6-Pyridylene
and $R_2$ may be
  1,4-phenylene and Bis-(4-phenylene)ether
Polytetraazopyrenes having the general formula:

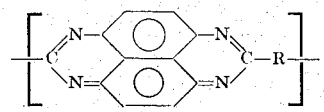

wherein R may be an
  isophthalic, terephthalic 2,6-naphthalenic, or
  oxybisbenzoic nucleus may also be prepared by the instant invention.

Illustrative of specific phenylene triazole polymers which may be sythesized via the instant process are the following:
  poly (m-phenylene) 4-phenyltriazole
  poly (m-, p-phenylene) 4-phenyltriazole
  poly [(1,3-phenylene), (2,6-naphthalene)]-4-phenyltriazole
  poly [(1,3-phenylene), (4,4'-biphenyl)]-4-phenyltriazole Poly (quinazolenediones) and poly (benzoxazinones) can also be produced by the cyclopoly-condensation reaction of 4,4-diaminobiphenyl - 3,3-dicarboxylic acid with aromatic diisocyanate and aromatic dicarboxylic acid compounds respectively.

The production of ladder polymers such as the polyquinone ethers and thioethers from the reaction of chloranil with tetrahydroxy - 1,4-benzoquinone, and various sulfides respectively is also contemplated in the present invention as is the synthesis of polyquinoxaline polymer via a 4-floro-3-nitroanilene polycondensation for example.

Of especial interest is the poly (imidazopyrrolones) wherein the acid groups were in the peri positions on the aromatic rings and the polypyrrones wherein the acid groups were in the ortho positions on the aromatic rings which may be synthesized via the instant process. These polymers are prepared by the reaction of aromatic dianhydrides with an aromatic tetraamine. Such dianhydrides and tetraamines as has been previously described are suitable reaction monomers. The most preferred polymer class that can be prepared via the molten Lewis Acid media of the instant invention are the poly (benzimidazo-benzophenanthrolines) i.e., the BBB polymers. These polymers differ from the previously discussed poly(imidazopyrrolones) only in the presence of the fused six-membered cyclic diimide structures. These polymers are made by condensing at least one organic tetra-amine with at least one tetracarboxylic acid (which also may be in the form of the corresponding dianhydride).

Illustrative of the organic tetra-amines that may be used in the BBB preparation are those depicted by the general formula:

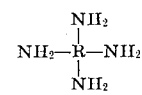

wherein R is an aromatic or cycloaliphatic tetravalent radical and wherein each of the four amino groups is attached directly to a carbon atom present in a ring of said aromatic or cycloaliphatic radical in a position which is ortho or peri to another carbon atom to which another of said amino groups is also directly attached. When R is an amino substituted bicyclic ring compound, such as a tetra-amino substituted naphthalene, the carbon atoms at the 1 and 8 positions are considered to be peri to each other as are the carbon atoms at the 4 and 5 positions. Five or six member rings are formed depending upon whether R is ortho or peri amino substituted respectively, as will be apparent to those skilled in the art. It is preferred that R be an aromatic radical rather than a cycloaliphatic radical. It is preferred that R contain up to about 20 carbon atoms.

Non-limiting examples of the tetra-amine monomers which may be used individually or in mutual admixture in forming the desired polymers are: 3,3'-diaminobenzidine; bis (3,4-diaminophenyl) methane; 1,2-bis(3,4-diaminophenyl) ethane; 2,2-bis (3,4-diamino phenyl) propane; bis(3,4-diamino phenyl) ether; bis(3,4-diamino phenyl) sulfide: bis (3,4-diamino phenyl) sulfone; 1,4,5,8-tetra-amino-naphthalene; 2,3,6,7-tetra-aminonaphthalene; etc.; and the corresponding ring-hydrogenated tetra-amines.

Illustrative of the tetracarboxylic acids (which also may be in the form of the corresponding dianhydride) which may be used to prepare the BBB polymers which may be synthesized via the instant invention are those which may be depicted by the following structural formula:

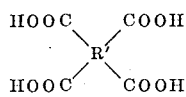

wherein R' is a tetravalent aromatic or cycloaliphatic radical wherein each of the four carboxyl groups is attached directly to a carbon atom present in a ring of said aromatic or cycloaliphatic radical in a position which is ortho or peri to another carbon atom to which another of said carboxyl groups is also directly attached. Where R' is a carboxyl substituted bicyclic fused ring compound, such as a tetra-carboxyl substituted naphthalene the carbon atoms at the 1 and 8 positions are considered to be peri to each other, as are the carbon atoms at the 4 and 6 positions. Five or six member rings are formed depending upon whether R' is ortho or peri carboxyl substituted respectively, as will be apparent to those skilled in the art. It is preferred that R' be an aromatic radical rather than a cycloaliphatic radical. It is preferred that R' contains up to about 20 carbon atoms.

Non-limiting examples of the tetracarboxylic acids are depicted under the polyamic acid description as well as the dianhydrides of such acids. The preferred tetracarboxylic acids contain carboxyl i.e., acid groups peri substituted upon a naphthalene nucleus. Of course, hompolymers can be synthesized when the amino groups and the carboxylic acid groups of the anhydride moiety are on the same aromatic ring structure.

The temperature range within which the polymerizations of the instant invention can take place should be from at least a temperature at which the Lewis Acid becomes molten up to but not exceeding the boiling point at the operating pressure of said acid or the decomposition temperatures of the monomers, polymer, or solvent.

After the high performance heterocyclic polymers have been formed according to the process disclosed above, they may be separated from the Lewis Acid eutectic by generally the same procedures employed with other catalysts for heterocyclic high performance polymer polymerizations such as phosphoric acid. After the reaction has been completed, the preferred process involves pouring the still molten reaction mixture into a large excess of water. In many cases, in order to increase the solubility of the Lewis Acid eutectic in water, the water should be rendered slightly acidic. After vigorous agitation, the water mixture is then filtered leaving behind the high performance heterocyclic polymer. The polymer may be further washed with water and where acid water was utilized, a sodium bicarbonate wash to neutralize the acid in the polymer may be employed. After the final washing steps the polymer is dried.

EXAMPLE I 0.01 moles (3.04 gms.) of naphthalene tetracarboxylic acid is admixed with 0.01 moles (2.15 gms.) of diamino benzidine in a eutectic solvent of aluminum trichloride (81 gms.) and sodium chloride (19 gms.) sufficient to realize a 4% solids level. The mixture is heated to 180°C. and held at this temperature with slow stirring for approximately 16 hours. The poly (bis-benzimidazo-benzophenanthroline) polymer obtained has an I.V. of 0.86 dl/g as measured at 0.4 percent concentration in about 97 percent $H_2SO_4$ at 25°C. -the standard method for these polymers.

EXAMPLE II

The reactants of Example I are admixed in a eutectic solvent of 44 mole percent zinc chloride: 56 mole percent stannous chloride (melting point 171°C.) sufficient to achieve a polymer solids level of approximately 6.5 percent. The mixture is held at 180°C. for 2 hours with stirring. The poly(bis benzimidazobenzophenanthroline) polymer obtained has an I.V. of 1.16 dl/g.

Example III 3,3' -diamino - 4,4' dimercapto biphenyl and isophthalic acid react in molten $KCl-AlCl_3$ (33:67 mole percent) to form a polybenzothiazole.

EXAMPLE IV

P-phenylene diisocyanate and 4,4'-diamino-biphenyl 3,3' -dicarboxylic acid react in molten $CuCl-SnCl_2$ (34.66 mole percent) to form a polyquinazolinedione.

EXAMPLE V 3,3' diamino benzidine and the diphenyl ester of 2,5-carboxylic acid react in molten $TlCl-SnCl_2$ (28.72 mole percent) to form a polybenzimidazole.

EXAMPLE VI 3,3' -diamino, 4,4' dihydroxy-biphenyl and the diphenyl ester of 2,5-carboxylic acid react in molten $NaCl-SnCl_2$ (32:68 mole percent) to form a polybenzoxazole.

EXAMPLE VII

M-phenylene diamine and 2,3,6,7-naphthalene tetracarboxylic acid react in molten $TiCl-ZnCl_2$ (48:52 mole percent) to form a polyamic acid which upon dehydration yields a polyimide.

EXAMPLE VIII 1,6 bis (diazo) hexane and 1,4-diethynylbenzene react in molten $ZnCl_2-KCl$ (54:46 mole percent) to form a polypyrazole.

EXAMPLE IX – XV

Naphthalene tetracarboxlic acid and diamino benzidine react in solvents of molten (9) SnCl$_2$-MnCl$_2$ (60:40 mole percent); (10) SnCl$_2$-CoCl$_2$ (96:4 mole percent); (11) CuCl-ZnCl$_2$ (12:88 mole percent); (12) KCl-ZnCl$_2$ (29:71 mole percent); (13) NaCl-ZnCl$_2$ (40.5:59.5 mole percent); (14) InCl$_3$-ZnCl$_2$ (4:96 mole percent); and (15) CoCl$_2$-ZnCl$_2$ (7:93 mole percent) to form a poly (bis benzimidazo benzophenanthroline).

EXAMPLE XVI 1,4-diglyoxalbenzene and 3,3- diamino benzidine react in molten NaCl-KCl-AlCl$_3$ (20-16.5-63.5 mole percent) to form a polyquinoxaline.

EXAMPLE XVII 4, fluoro-3-nitroaniline is polycondensed in ZnCl$_2$-NaCl-KCl (60-20-20 mole percent) to form a polyquinoxaline.

As this invention may be embodied in several forms without departing from the spirit or essential character thereof, the present embodiments are illustrative and not restrictive. The scope of the invention is defined by the appended claims rather than by the descriptions preceding them and are embodiments which fall within the meaning and range of equivalency of the claim are, therefore, intended to be embraced by those claims.

I claim:

1. In a process for synthesizing poly (benzimidazobenzphenanthrolines) from a tetracarboxylic acid reactant represented by the formula

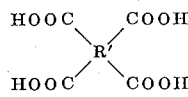

wherein R' is a tetravalent aromatic or cyclo-aliphatic radical, wherein each of the four carbonyl groups is attached directly to a carbon atom present in a ring of said aromatic or cyclo-aliphatic radical in a position which is ortho- or peri- to another carbon atom to which another of said carboxyl groups is also directly attached, or the corresponding anhydride and a tetraamine reactant represented by the general formula

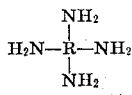

wherein R is an aromatic or cycloaliphatic tetravalent radical and wherein each of the four amino groups is attached directly to a carbon ring present in a ring of said aromatic or cyclo-aliphatic radical in a position which is ortho- or para- to another carbon atom, to which another set of amino groups is also directly attached, by heat reacting said reactants at a temperature below their decomposition temperature, the improvement which comprises:

utilizing as a catalyst a heavy metal halide in admixture with a salt component which is non-reactive with said heavy metal halide and which forms a eutectic mixture therewith wherein said eutectic mixture has a melting point below the reaction temperature of said reactants and a melting point lower than that of the pure heavy metal halide.

2. The process of claim 1 wherein the heavy metal halide is a transition element halide.

3. The process of claim 2 wherein the heavy metal transition element has a +2 valance state.

4. The process of claim 2 wherein the heavy metal transition element has a +3 valance state.

5. The process of claim 2 wherein the heavy metal transition element halide is a heavy metal transition element chloride.

6. The process of claim 2 wherein the heavy metal transition element halide is a non-hydrolizable bromide.

7. The process of claim 2 wherein the heavy metal transition element halide is selected from the group consisting of antimony trichloride, bismuth trichloride, aluminum trichloride, stannous dichloride, gallium chloride, germanium bromide, germanium chloride, zinc bromide, and zinc chloride.

8. The process of claim 1 wherein the tetraamine is selected from 3,3'-diaminobenzidine, bis(3,4-diamino phenyl) methane, 1,2-bis(3,4-diamino phenyl) ethane, 2,2-bis(3,4-diamino phenyl) propane, bis(3,4-diamino phenyl) ether, bis(3,4-diamino phenyl) sulfide, bis(3,4-diamino phenyl) sulfone, 1,4,5,8-tetraaminonaphthalene, 2,3,6,7-tetraaminonaphthalene, and their corresponding ring-hydrogenated tetraamines, and wherein the tetracarboxylic acid is selected from naphthalene tetracarboxylic acid, pyromellitic acid, and their anhydrides.

9. The process of claim 8 wherein the heavy metal halide is a transition element halide.

10. The process of claim 9 wherein the heavy metal transition element halide is selected from the group consisting of antimony trichloride, bismuth trichloride, aluminum trichloride, stannous dichloride, gallium chloride, germanium bromide, germanium chloride, zinc bromide and zinc chloride.

* * * * *